(12) United States Patent
Topchy et al.

(10) Patent No.: US 11,863,294 B2
(45) Date of Patent: ***Jan. 2, 2024

(54) METHODS AND APPARATUS FOR INCREASING THE ROBUSTNESS OF MEDIA SIGNATURES

(71) Applicant: The Nielsen Company (US), LLC, New York, NY (US)

(72) Inventors: Alexander Topchy, New Port Richey, FL (US); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/728,751

(22) Filed: Apr. 25, 2022

(65) Prior Publication Data

US 2022/0255651 A1  Aug. 11, 2022

Related U.S. Application Data

(63) Continuation of application No. 17/140,914, filed on Jan. 4, 2021, now Pat. No. 11,316,603, which is a
(Continued)

(51) Int. Cl.
*H04H 60/59* (2008.01)
*H04N 21/442* (2011.01)
(Continued)

(52) U.S. Cl.
CPC ............ *H04H 60/59* (2013.01); *H04H 60/37* (2013.01); *H04H 60/58* (2013.01);
(Continued)

(58) Field of Classification Search
CPC ........ H04H 60/59; H04H 60/37; H04H 60/58; H04H 2201/90; H04N 21/4363; H04N 21/4394; H04N 21/44008; H04N 21/44204
See application file for complete search history.

(56) References Cited

U.S. PATENT DOCUMENTS 7,457,431 B2  11/2008  Shi et al.
7,580,832 B2   8/2009  Allamanche et al.
(Continued)

FOREIGN PATENT DOCUMENTS

WO      0079518 A1   12/2000
WO   2010027847 A1    3/2010

OTHER PUBLICATIONS

Haitsma et al., "A Highly Robust Audio Fingerprinting System",Philips Research, 2002, Eindhoven, The Netherlands, 9 pages.
(Continued)

*Primary Examiner* — Adil Ocak

(57) ABSTRACT

Methods and apparatus for determining increasing robustness of media signatures are disclosed. An example apparatus disclosed herein is to select to at least one of (A) boost a first characteristic of a media signal at a first time or (B) attenuate a second characteristic of the media signal at a second time based on an effect of the at least one of the boost of the first characteristic or the attenuation of the second characteristic on a difference between a third characteristic of the media signal at a third time and a fourth characteristic of the media signal at a fourth time. The disclosed example apparatus is also to perform the selected one of (A) the boost of the first characteristic of the media signal at the first time or (B) the attenuation of the second characteristic of the media signal at the second time to enhance the media signal.

20 Claims, 5 Drawing Sheets

Related U.S. Application Data continuation of application No. 16/735,319, filed on Jan. 6, 2020, now Pat. No. 10,887,034, which is a continuation of application No. 16/263,918, filed on Jan. 31, 2019, now Pat. No. 10,530,510, which is a continuation of application No. 15/341,855, filed on Nov. 2, 2016, now Pat. No. 10,225,031.

(51) Int. Cl.
*H04H 60/58* (2008.01)
*H04H 60/37* (2008.01)
*H04N 21/4363* (2011.01)
*H04N 21/439* (2011.01)
*H04N 21/44* (2011.01)

(52) U.S. Cl.
CPC ..... *H04N 21/4363* (2013.01); *H04N 21/4394* (2013.01); *H04N 21/44008* (2013.01); *H04N 21/44204* (2013.01); *H04H 2201/90* (2013.01)

(56) References Cited

U.S. PATENT DOCUMENTS

| | | | |
|---|---|---|---|
| 8,280,185 B2 | 10/2012 | Demandolx | |
| 8,805,865 B2 | 8/2014 | Samari et al. | |
| 8,861,931 B2 | 10/2014 | Lee et al. | |
| 9,197,908 B2 | 11/2015 | Lee et al. | |
| 9,208,790 B2 | 12/2015 | Bilobrov | |
| 9,332,363 B2 | 5/2016 | Jain et al. | |
| 10,225,031 B2 | 3/2019 | Topchy et al. | |
| 10,530,510 B2 | 1/2020 | Topchy et al. | |
| 10,887,034 B2 | 1/2021 | Topchy et al. | |
| 2005/0248594 A1 | 11/2005 | Usui et al. | |
| 2012/0243727 A1 | 9/2012 | Hwang et al. | |
| 2014/0028914 A1 | 1/2014 | Polak et al. | |
| 2016/0261917 A1 | 9/2016 | Trollope et al. | |

OTHER PUBLICATIONS

United States Patent and Trademark Office, "Final Office Action", issued in connection with U.S. Appl. No. 15/341,855 dated Jun. 28, 2018, 28 pages.

United States Patent and Trademark Office, "Non-Final Office Action", issued in connection with U.S. Appl. No. 15/341,855 dated Dec. 1, 2017, 21 pages.

United States Patent and Trademark Office, "Notice of Allowance and Fee(s) Due", issued in connection with U.S. Appl. No. 15/341,855 dated Oct. 12, 2018, 9 pages.

United States Patent and Trademark Office, "Notice of Allowance and Fee(s) Due", issued in connection with U.S. Appl. No. 16/263,918 dated Aug. 29, 2019, 8 pages.

United States Patent and Trademark Office, "Notice of Allowance and Fee(s) Due", issued in connection with U.S. Appl. No. 16/735,319, dated Sep. 4, 2020, 10 pages.

United States Patent and Trademark Office, "Notice of Allowance and Fee(s) Due", issued in connection with U.S. Appl. No. 17/140,914, dated Dec. 22, 2021, 10 pages.

US 11,863,294 B2

METHODS AND APPARATUS FOR INCREASING THE ROBUSTNESS OF MEDIA SIGNATURES

RELATED APPLICATION

This patent arises from a continuation of U.S. patent application Ser. No. 17/140,914, entitled "METHODS AND APPARATUS FOR INCREASING THE ROBUSTNESS OF MEDIA SIGNATURES," filed on Jan. 4, 2021, which is a continuation of U.S. patent application Ser. No. 16/735,319, entitled "METHODS AND APPARATUS FOR INCREASING THE ROBUSTNESS OF MEDIA SIGNATURES," filed on Jan. 6, 2020, which is a continuation of U.S. patent application Ser. No. 16/263,918, entitled "METHODS AND APPARATUS FOR INCREASING THE ROBUSTNESS OF MEDIA SIGNATURES," filed on Jan. 31, 2019, which is a continuation of U.S. patent application Ser. No. 15/341,855, entitled "METHODS AND APPARATUS FOR INCREASING THE ROBUSTNESS OF MEDIA SIGNATURES," filed on Nov. 2, 2016. Priority to U.S. patent application Ser. Nos. 17/140,914, 16/735,319, 16/263,918, and 15/341,855 is claimed. U.S. patent application Ser. Nos. 17/140,914, 16/735,319, 16/263,918, and 15/341,855 are incorporated herein by reference in their entireties.

FIELD OF THE DISCLOSURE

This disclosure relates generally to media identification or recognition, and, more particularly, to methods and apparatus for increasing the robustness of media signatures.

BACKGROUND

Media monitoring meters are used in homes and other locations to determine exposure to media (e.g., audio media and/or video media) output by media output devices or media rendering devices. Such media output devices include televisions, radios, computers, mobile devices, tablets, and/or any other device capable of outputting media. In some examples, the meter generates a signature (e.g., also referred to as "media fingerprints" or just "fingerprints" in the context of media monitoring and/or audience measurement) of the media based on the characteristics of an audio, video, and/or image component of the media. In such examples, the meter transmits the signature to the audience measurement entity. The audience measurement entity compares the generated signature to stored signatures in a database to identify a match, thereby identifying and/or recognizing the media. The audience measurement entity monitors media exposure based on a match between the generated signature and a stored signature.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
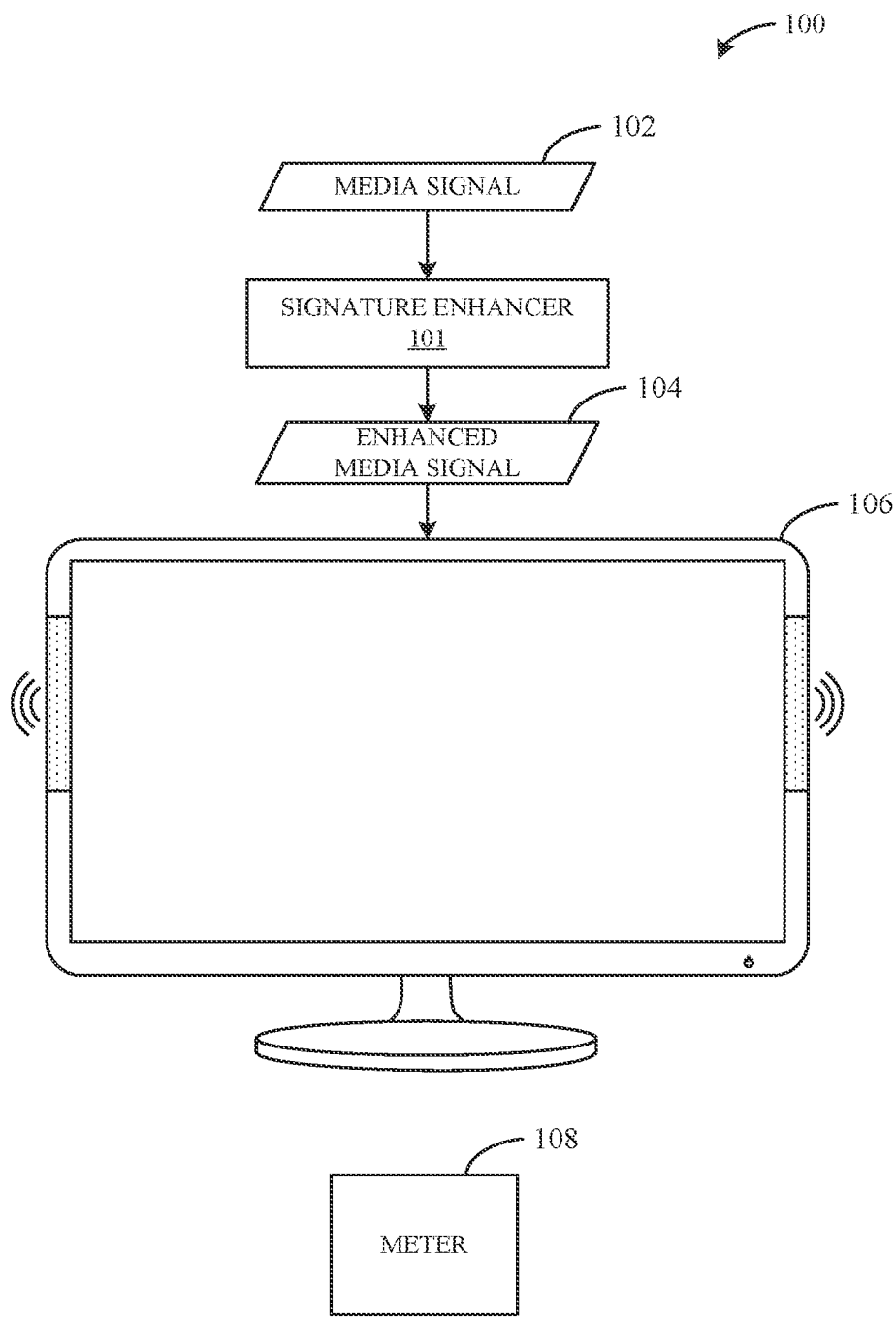
FIG. 1 is an illustration of an example signature enhancer for increasing robustness of media signatures.

Media monitoring meters and/or media recognition devices are used by an audience measurement entity to gather media exposure data (e.g., exposure to audio, video, or images) from a media output device(s) (e.g., a television, a radio, a computer, etc.). In some examples, the meter may be, or be incorporated into, a device including a wired or wireless connection, microphone, magnetic coupling device, and/or other sensor to gather ambient audio, video, and/or images. In such examples, when the media output device is outputting media, the meter may receive an audio signal and/or capture a video/image signal (e.g., via a camera and/or sensor) transmitted by the media output device. As further described below, the meter may generate signatures based on the media. Alternatively, the meter may intercept the media signal transmitted to the media output device and generate signatures based on characteristics of the intercepted media signal. The meter transmits generated query signatures to the audience measurement entity and the audience measurement entity compares the generated signature to reference signatures. Reference signatures are known signatures corresponding to media that is monitored by the audience measurement entity. When the audience measurement entity matches the generated signature to a reference signature, the audience measurement entity credits the reference media content based on the exposure.

Signature or fingerprint-based media recognition is a technique that generally uses one or more inherent characteristics of the media to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring/recognition generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and some reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

There is a plurality of signaturing algorithms used to identify media. Many signaturing algorithms are based on a comparison of two or more characteristics of a media signal. For example, a frequency-based energy comparison signaturing algorithm includes comparing the energies of two different frequency bands of a media signal to generate a bit value. In such an example, the bit value b corresponds to a '1' when the energy of the first frequency band is greater than the energy of the second frequency band, and the bit value corresponds to a '0' when the energy of the first frequency band is lower than the energy of the second frequency band (e.g., $\Delta E = E_{F1} - E_{F2}$, where a bit value b=0 if $\Delta E < 0$ and b=1 if $\Delta E > 0$). A time-based energy comparison signaturing algorithm includes comparing the energies of the media signal at different points in time to generate a bit value. In such a signaturing algorithm, the bit value is set to '1' when the energy of the media signal at a first time is higher than the energy of the media signal at a second time and the bit value corresponds to a '0' when the energy of the media signal at the first time is lower than the energy of the media signal at the second time (e.g., $\Delta E = E(t) - E(t - \Delta t)$, where a bit value b=0 if $\Delta E < 0$ and b=1 if $\Delta E > 0$). A discrete cosine transform (DCT) signaturing algorithm includes comparing DCT coefficients of a media signal. In such a signaturing algorithm, the bit value is set '1' when a first DCT coefficient of the media signal is higher than a second DCT coefficient of the media signal and the bit value corresponds to a '0' when the first DCT coefficient of the media signal is lower than the second DCT coefficient of the media signal. A time-interval signaturing algorithm includes determining a time interval between certain characteristics, such as spectrogram peaks, in the media signal and generating a bit value based on the time interval. Additionally, there is a vast plurality of other signaturing algorithms that exploit other characteristics and transformations of a media signal, such as auto-correlation, Hilbert transform, time-frequency plane representation, etc.

Examples disclosed herein preprocess a media signal to enhance the characteristics of the media signal based on a particular signaturing algorithm prior to outputting the media to a media output device. As described above, many signature techniques generate a code (e.g., a binary code) representative of multiple comparisons of two different characteristics of the media signal. For example, as described above, the frequency-based energy comparison signaturing algorithm is based on a comparison of energies of a block of audio of the media signal at two different frequency bands (e.g., $\Delta E = E_{F1} - E_{F2}$, where a bit value b=0 if $\Delta E < 0$ and b=1 if $\Delta E > 0$). However, the media signal is subject to noise that may increase and/or decrease the energies of two frequency bands. When the noise increases and/or decreases the energies of frequency bands, the bit value may inadvertently change values (e.g., from b=0 to b=1 or vice versa). Examples disclosed herein alleviate the effect of noise by preprocessing the media signal to enhance the media signal and increase the difference corresponding to the comparison. For example, using the above signaturing algorithm, examples disclosed herein determine if a comparison of energies at two frequency bands results in a difference less than a threshold (e.g., $|E_{F1} - E_{F2}| < 1$). If the comparison of the energies of the two frequency bands results in a difference less than the threshold (e.g., if $E_{F1} = 3.2$ and $E_{F2} = 2.5$, then $|E_{F1} - E_{F2}| = 0.3$ which is less than the threshold), examples disclosed herein enhance the comparison by increasing the energy of the frequency band with the higher energy (e.g., increase $E_{F1}$ from 3.5 to higher energy) and/or decreasing the energy of the frequency band with the lower energy (e.g., increase $E_{F2}$ from 3.2 to some lower energy), e.g., possibly within the limits established by psychoacoustic masking properties, to increase the energy difference between the two frequency bands to satisfy the threshold, thereby increasing $\Delta E$. In this manner, even if noise changes the energies of the two frequency bands of monitored or recognized media, the probability of change of the actual bit values (e.g., $\Delta E$ changing from positive to negative or vice versa) is minimized. Thus, the probability that a meter or other media recognizing device will match a captured signature to a corresponding reference signature substantially increases. Additionally or alternatively, examples disclosed herein may adjust any characteristic of media based on any signaturing algorithm.

FIG. 1 illustrates an example environment 100 including an example signature enhancer 101 for preprocessing an example media signal 102 to increase the robustness of generated signatures of the example media signal 102. The example environment 100 includes the example the example signature enhancer 101, the example media signal 102, an example enhanced media signal 104, an example media output device 106, and an example meter 108.

The example signature enhancer 101 preprocesses the media signal 102 to generate the enhanced media signal 104. In some examples, the example signature enhancer 101 is located at a remote site and/or a remote server and preprocesses the media signal 102 off site. In some examples, the example signature enhancer 101 is located in the vicinity of the example media output device 106. For example, the signature enhancer 101 may be a device that receives the media signal 102 via a communication network (e.g., a cable network, a telephonic network, a network communications network, etc.) and locally enhances the media signal 102 prior to transmitting to the example media output device 106. Alternatively, the example signature enhancer 101 may be coupled to, embedded in, or otherwise connected to media signal receiving device (e.g. a set-top box, an over-the-top device, a gaming console, an antenna, a computer, a network communication device, a media player, a tablet, the example media output device 106, and/or any device that is capable of receiving a media signal). The example signature enhancer 101 enhances characteristics of the example media signal 102 based on a selected signaturing algorithm to increase the robustness of media signatures corresponding to the example media signal 102, as further described in conjunction with FIG. 2. The example signature enhancer 101 transmits the example enhanced media signal 104 (e.g., the example media signal 102 after being enhanced) to the example media output device 106.

The example media output device 106 is a device that outputs media (e.g., including the example enhanced media signal 104). Although the example media output device 106 of FIG. 1 is illustrated as a television, the example media output device may be a radio, an MP3 player, a video game counsel, a stereo system, a mobile device, a computing device, a tablet, a laptop, a projector, a DVD player, a set-top-box, an over-the-top device, and/or any device capable of outputting media. The example media output device 106 may include and/or may be coupled to a display to output images and/or video. Additionally, the example media output device 106 may include speakers and/or may be coupled, or otherwise connected to portable speakers that output an audio portion of the example enhanced media signal 104.

The example meter 108 is a device that monitors exposure to media and/or otherwise recognizes the media, including media output by the example media output device 106. In some examples, the example meter 108 is a device including a microphone and/or magnetic coupling device to gather ambient audio. In some examples, the meter 108 is embedded in or otherwise connected to a device that includes a microphone and/or magnetite coupling device. In some examples, the meter 108 is embedded in the example media output device 106. In some examples, the meter 108 includes, or is connected to, a camera and/or sensor to gather the enhanced media signal 104 output by the example media output device 106. The example meter 108 may be a media monitoring device, a media recognizing device, a mobile device, a computer, a personal digital assistance, and/or any device capable of gathering ambient audio. The example meter 108 generate signatures of the enhanced media signal 104 output by the example media output device 106 to identify the media.

Figure 2:
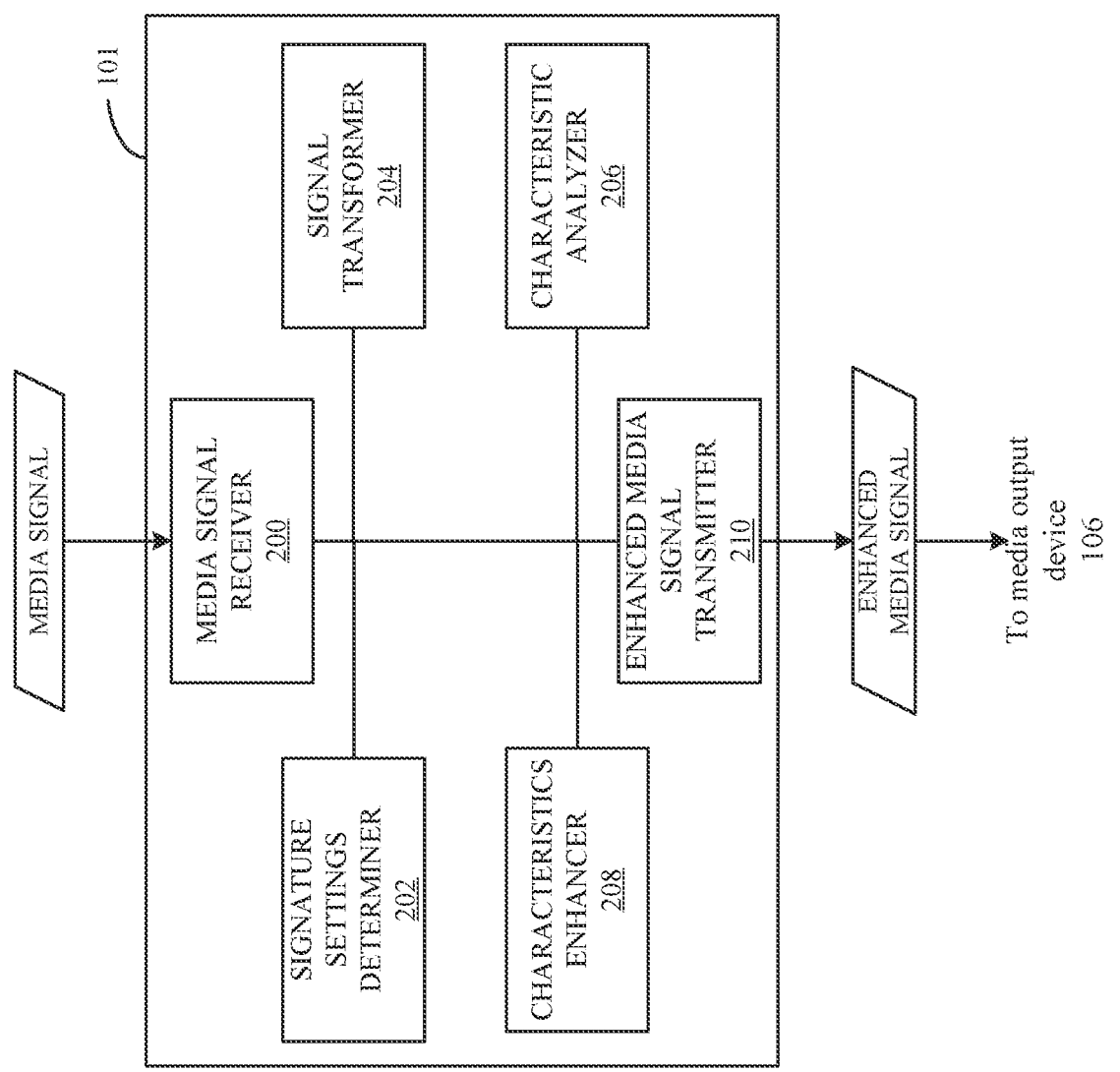
FIG. 2 is a block diagram of the example signature enhancer of FIG. 1.

FIG. 2 is a block diagram of an example implementation of the example signature enhancer 101 of FIG. 1, disclosed herein, to increase the robustness of media signatures by enhancing the example media signal 102. While the example signature enhancer 101 is described in conjunction with the example media signal 102 and media output device 106 of FIG. 1, the example signature enhancer 101 may be utilized to optimize placement of any type of media signal output by any type of media device. The example signature enhancer 101 receives the example media signal 102 and outputs the example enhanced media signal 104 of FIG. 1. The example signature enhancer 101 includes an example media signal receiver 200, an example signature settings determiner 202, an example signal transformer 204, an example characteristic analyzer 206, an example characteristics enhancer 208, and an example enhanced media signal transmitter 210.

The example media signal receiver 200 receives the example media signal 102. The media signal 102 is a signal corresponding to media that will be output by the example media output device 106 (FIG. 1). The example media signal 102 may be an audio signal, a video signal, and/or an image signal. The example media signal 102 may be originated from a media producer and/or a media distributer. As described above, the media signal includes intrinsic characteristics that may be analyzed to generate a signature. The generated signature may be compared to a database of reference signatures to determine exposure to the media.

The example signature settings determiner 202 selects a signaturing algorithm from a plurality of signaturing algorithms as the basis for an enhancement. As described above, there is a plurality of ways to generate a signature (e.g., a plurality of signaturing algorithms) from a media signal (e.g., comparing energy of different frequencies, comparing energies at different point in time, comparing DCT coefficients, etc.). How the example media signal 102 is enhanced depends on how the example meter 110 will generate a signature of the media signal 102. In order to enhance the media signal 102 properly, the signaturing algorithm should match the signaturing algorithm of the example meter 110. However, there may be other meters corresponding to different signaturing algorithms. Accordingly, the signature settings determiner 202 may select one or more signaturing algorithms as the basis for the enhancing. In some example, the signature settings determiner 202 determines the one or more signaturing algorithm based on user and/or manufacture settings. In some examples, the signature settings determiner 202 determines the one or more signaturing algorithm based on the example media signal 102. For example, when the example media signal 102 may dynamically select a signature signal based on whether the media signal 102 is an audio signal, a video signal, an image signal, etc. In some examples, the signature settings determiner 202 selects different signaturing algorithms at different points in time. The signature settings may be adjusted at any point in time to allow the signature settings determiner 202 to change the selected signaturing algorithm.

The example signal transformer 204 transforms the received media signal 102 into the frequency domain (e.g., determining the frequency spectrum) when the signaturing algorithm is based on the frequency domain. For example, the signal transformer 204 may perform a Fourier transform on the media signal 102 to transform the media signal 102 into the frequency domain. As described above, some signaturing algorithms are based on comparisons of the characteristics of different frequency bands of the frequency spectrum. Accordingly, the example signal transformer 204 may transform the example media signal 102 so that the example signature enhancer 101 may (A) determine when a comparison of characteristics will not satisfy a comparison threshold and (B) when the comparison of characteristics does not satisfy the comparison threshold, enhance the one of more of the characteristics to satisfy the comparison threshold, as further described below. In some examples, one the example media signal 102 has been enhanced in the frequency domain, the example signal transformer 204 transforms the enhanced media signal back into the time domain prior to being transmitted by the example enhanced media transmitter 210.

The example characteristic analyzer 206 analyzes (e.g., compares) the characteristics of the media signal 102 based on the selected signaturing algorithm. For example, if the signaturing algorithm is based on the differences between the energies of neighboring frequency bands (e.g., $\Delta E_{1,2} = E_{F1} - E_{F2}$, where a bit value b=0 if $\Delta E_{1,2} < 0$ and b=1 if $\Delta E_{1,2} > 0$), then the example characteristic analyzer 206 will compute all of the differences (e.g., $\Delta E_{1,2}, \Delta E_{3,4}, \ldots, \Delta E_{N-1,N}$) in a manner consistent with the selected algorithm. In another example, if the signaturing algorithm is based on differences between magnitudes DCT values of a video or image (e.g., $\Delta DCT_{1,2} = DCT_1 - DCT_2$, where a bit value b=0 if $\Delta DCT_{1,2} < 0$ and b=1 if $\Delta DCT_{1,2} > 0$), then the example characteristic analyzer 206 will compute all of the differences (e.g., $\Delta DCT_{1,2}, \Delta DCT_{3,4}, \ldots, \Delta DCT_{N-1,N}$) in a manner consistent with the selected algorithm. Additionally or alternatively, the example characteristic analyzer 206 may analyze the characteristics of the media signal 102 based on any type of selected signaturing algorithm (e.g., based on a comparison and/or ratio of characteristics of a media signal, a peak detection comparison on pseudo-energy curves, etc.). Once the example analyzer 206 analyzes the comparisons of the media signal 102 based on the selected signaturing algorithm, the example analyzer 206 determines which of the comparisons do not satisfy a comparison threshold (e.g., by flagging the comparisons that do not satisfy the comparison threshold). For example, if the frequency algorithm is based on the energy of the example media signal 102 across time (e.g., $\Delta E_1 = E(T_1 + \Delta T) - E(T_1)$, where a bit value (b)=0 if $\Delta E_1 < 0$ and b=1 if $\Delta E_1 > 0$) and the comparison threshold is 1, then the characteristic analyzer 206 may flag any comparison whose absolute value is less than 1 (e.g., $|E(T+\Delta T) - E(T)| < 1$). Each signaturing algorithm may correspond to a different comparison threshold due to the variance of noise for a particular signaturing algorithm. In some examples, where the signature settings determiner 202 identified more than one signaturing algorithm, the example characteristic analyzer 206 may analyze the media signal 102 in different ways using the two or more signaturing algorithms.

The example characteristics enhancer 208 enhances the example media signal 102 by boosting and/or attenuating characteristics of the media signal 102 based on the selected signaturing algorithm and the flagged comparisons (e.g., the comparisons that don't satisfy the threshold comparison value). In some examples, the characteristics enhancer 208 boosts the characteristic of a flagged comparison corresponding to the stronger (e.g., higher) characteristic. Additionally or alternatively, the characteristics enhancer 208 may decrease (e.g., attenuate) the characteristic of the flagged comparison corresponding to the weaker (e.g., lower) characteristic. For example, in a frequency-based energy comparison signaturing algorithm, where the energy of a first frequency band is 3.3, the energy of a second frequency band is 3.0, and the threshold comparison is 1 (e.g., $|E_{F1}-E_{F2}|=0.3$, which is less than the threshold), the example characteristics enhancer 208 may boost the energy of the first frequency ($E_{F1}$) and/or decrease the energy of the second frequency ($E_{F2}$) to satisfy the comparison threshold. In some examples, the characteristics enhancer 208 boosts and/or decreases characteristics of the example media signal 102 according to psychoacoustic masking properties. For example, the characteristics enhancer 208 may not boost and/or attenuate a characteristic above/below a particular level to ensure that the quality of the media signal does not deteriorate in a manner that may be identified by the human eye/ear. Additionally, there may be other limits to the amount boosting and/or decreasing of the characteristics of the media signal 102 based on other media signal requirements. In some examples, the characteristics enhancer 208 may determine which characteristics to boost and/or decrease based on subsequent comparisons. For example, if boosting an energy of a first frequency of the media signal 102 at a first time satisfies the comparison threshold at the first time, however such boosting of the energy of the first frequency at a second subsequent time does not satisfy the comparison threshold at the second time, the example characteristics enhancer 208 may decrease a second frequency of the media signal 102 at the first time to satisfy the comparison threshold at the first time. Once the example characteristics enhancer 208 enhances the example media signal 102, the example enhanced media signal transmitter 210 transmits the example enhanced media signal 104 to the example media output device 106 of FIG. 1.

While example manners of implementing the example signature enhancer 101 of FIG. 1 is illustrated in FIG. 2, elements, processes and/or devices illustrated in FIG. 2 may be combined, divided, re-arranged, omitted, eliminated and/or implemented in any other way. Further, the example media signal receive 200, the example signature settings determiner 202, the example signal transformer 204, the example characteristics analyzer 206, the example characteristics enhancer 208, the example enhanced media signal transmitter 210, and/or, more generally, the example signature enhancer 101 of FIG. 2, may be implemented by hardware, machine readable instructions, software, firmware and/or any combination of hardware, machine readable instructions, software and/or firmware. Thus, for example, any of the example media signal receive 200, the example signature settings determiner 202, the example signal transformer 204, the example characteristics analyzer 206, the example characteristics enhancer 208, the example enhanced media signal transmitter 210, and/or, more generally, the example signature enhancer 101 of FIG. 2 could be implemented by analog and/or digital circuit(s), logic circuit(s), programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example media signal receive 200, the example signature settings determiner 202, the example signal transformer 204, the example characteristics analyzer 206, the example characteristics enhancer 208, the example enhanced media signal transmitter 210, and/or, more generally, the example signature enhancer 101 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example signature enhancer 101 of FIG. 2 includes elements, processes and/or devices in addition to, or instead of, those illustrated in FIGS. 3 and 4, and/or may include more than one of any or all of the illustrated elements, processes and devices.

Figure 3:
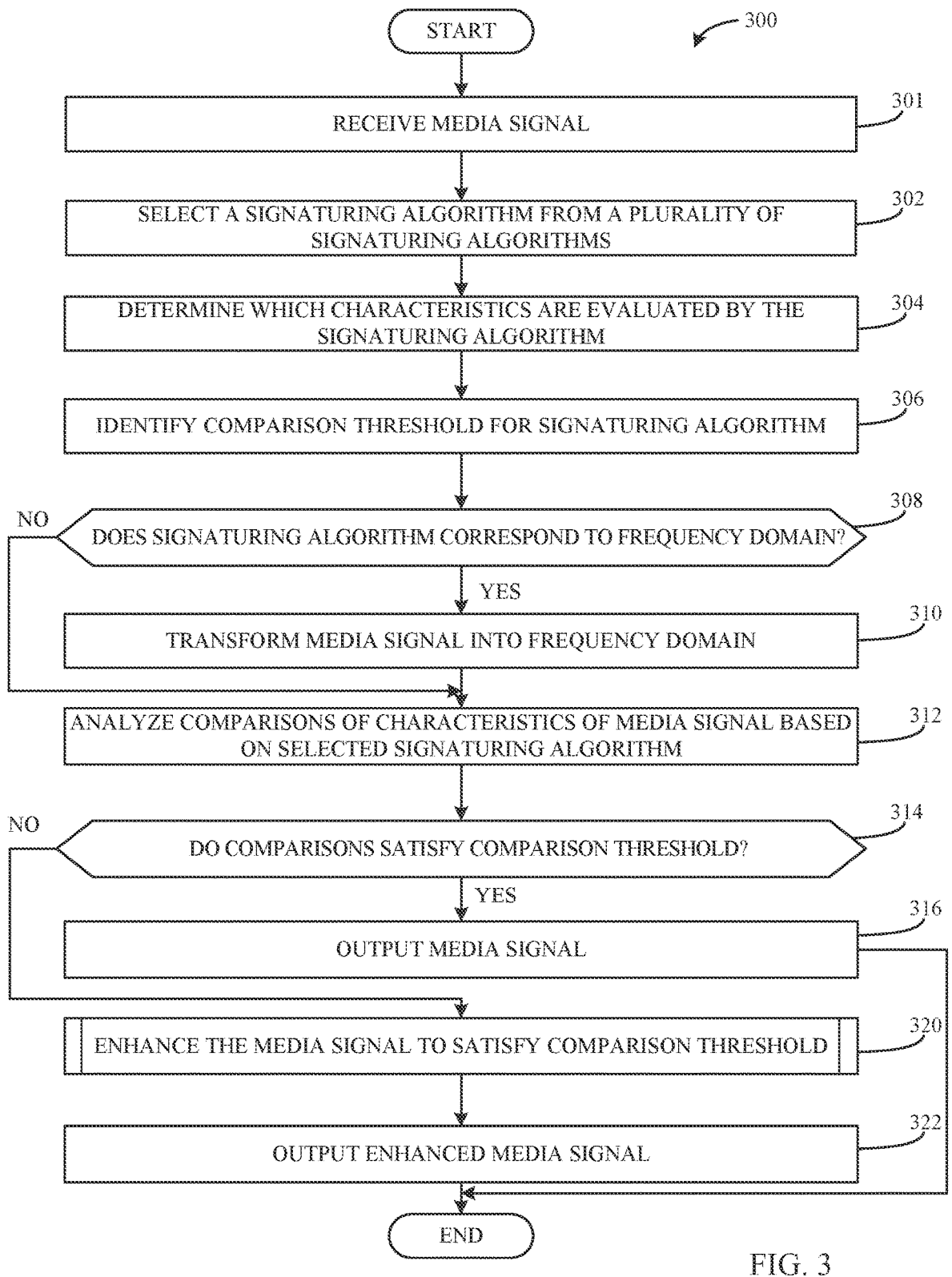
FIGS. 3-4 are flowcharts representative of example machine readable instructions that may be executed to implement the example signature enhancer of FIGS. 1 and 2 to increase the robustness of media signatures.
Figure 4:
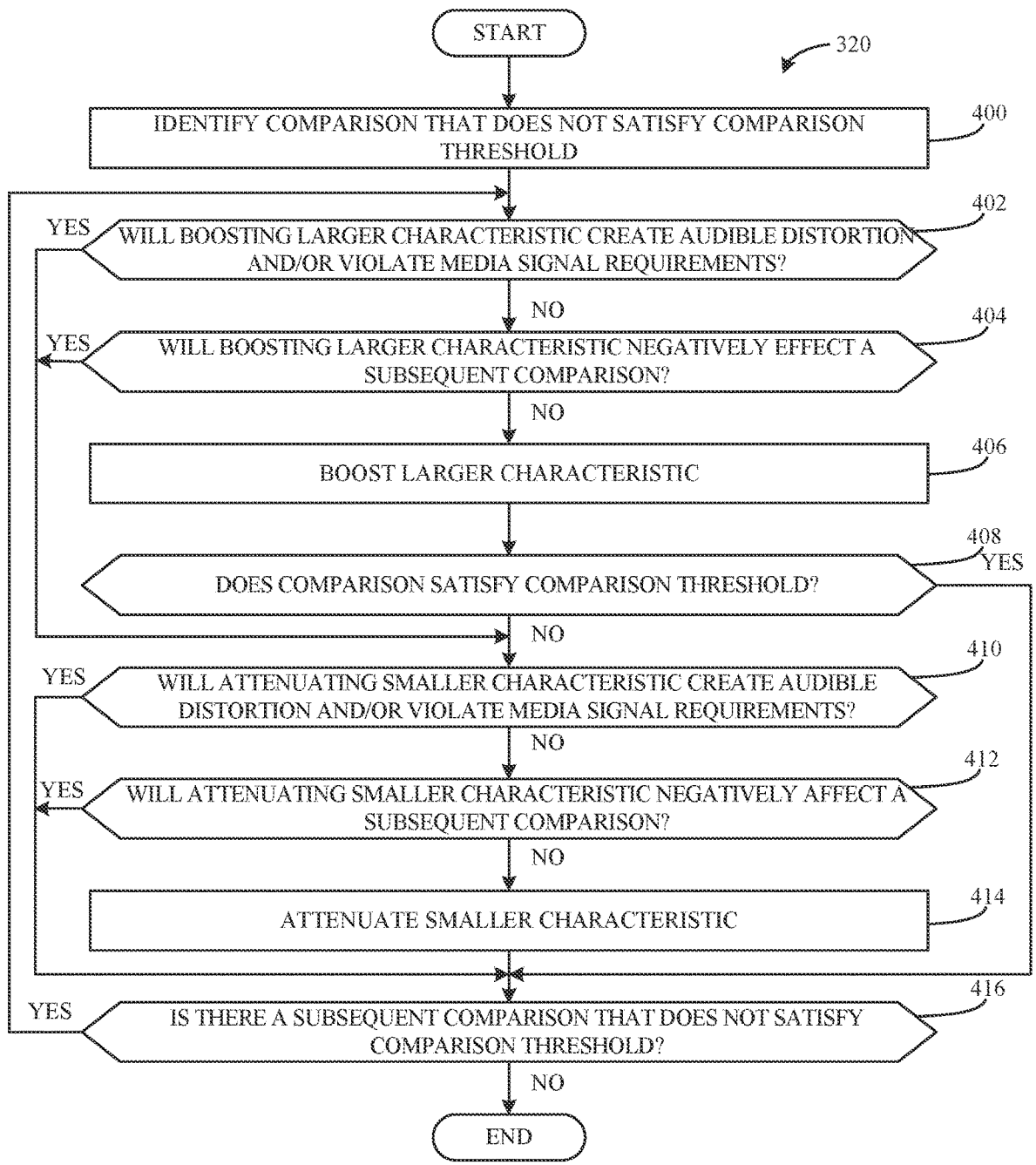

A flowchart representative of example machine readable instructions for implementing the example signature enhancer 101 of FIG. 1 is shown in FIGS. 3 and 4. In the examples, the machine readable instructions comprise a program for execution by a processor such as the processor 512 shown in the example processor platform 500 discussed below in connection with FIG. 5. The program may be embodied in machine readable instructions stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3 and 4, many other methods of implementing the example signature enhancer 101 of FIGS. 1 and 2 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example signature enhancer 101 of FIGS. 1 and 2 to increase the robustness of signatures corresponding to the example media signal 102 of FIGS. 1 and 2. Although the instructions of FIG. 3 are described in conjunction with the example signature enhancer 101 of FIGS. 1 and 2, the example instructions may be utilized by any type of signature enhancer.

At block 301, the example media signal receiver 200 receives the example media signal 102. As described above in conjunction with FIG. 2, the example media signal 102 is a signal corresponding to audio, video, and/or an image to be output by the example media output device 106. The media signal 102 includes unique characteristics that may be used to identify the media signal by generating a signature of the example media signal 102 and comparing the generated signature to a reference signature.

At block 302, the example signature settings determiner 202 selects a signaturing algorithm from a plurality of signaturing algorithms. As described above in conjunction with FIG. 2, the selection of the signaturing algorithm may be based on the media signal 102, the meter 108, settings and/or preferences of a user and/or manufacturer of the example signature enhancer 101, etc. At block 304, the example characteristics analyzer 206 determines which characteristics are evaluated by the selected signaturing algorithm. For example, the signaturing algorithm may include a comparison of energy levels in the time domain, energy levels in the frequency domain, peak values in the frequency domain, DCT coefficients, and/or any other comparison of characteristics of any type of media signal. At block 306, the example characteristic analyzer 206 identifies a comparison threshold for the signaturing algorithm. As described above in conjunction with FIG. 2, each signaturing algorithm may correspond to a different comparison threshold based on variance of noise that may affect the characteristics.

At block 308, the example the example signal transformer 204 determines if the selected signaturing algorithm corresponds to the frequency domain. For example, if the signaturing algorithm includes comparing characteristics associated with the frequency spectrum, then the signaturing algorithm corresponds to the frequency domain. If the example signal transformer 204 determines that the selected signaturing algorithm corresponds to the frequency domain (block 308), then the example signal transformer 204 transforms the media signal 102 into the frequency domain (block 310). In some examples, the signal transformer 204 transforms the media signal 102 into the frequency domain using a Fourier transform.

At block 312, the example characteristic analyzer 206 analyzes comparisons of characteristics of the example media signal 102 based on the selected signaturing algorithm. For example, if the selected signaturing algorithm is based on a comparison (e.g., a difference) between DCT values of a video signal, then the example characteristic analyzer 206 computes the differences between DCT values of the video signal that would be utilized to generate a signature. In other words, the example characteristic analyzer 206 analyzes the media signal 102 based on performing the selected signaturing algorithm on the received media signal 102 to identify the differences. At block 314, the example characteristic analyzer 206 determines if all comparisons associated with the selected signaturing algorithm satisfy the identified comparison threshold. In some examples, the example characteristic analyzer 206 flags each comparison that does not satisfy the identified comparison threshold. If the example characteristic analyzer 206 determines that all of the comparisons satisfy the comparison threshold (block 314), the example enhanced signal transmitter 210 outputs the example media signal 102 (block 316), because the example media signal 102 does not need to be enhanced. If the example characteristic analyzer 206 determines that all of the comparisons do not satisfy the comparison threshold (block 314), the example characteristics enhancer 208 enhances the media signal 102 to satisfy the comparison threshold (block 320), as further described in conjunction with FIG. 4. At block 322, the example enhancer media signal transmitter 210 outputs the example enhanced media signal 104 to the example media output device 106 of FIG. 1.

FIG. 4 is an example flowchart 320 representative of example machine readable instructions that may be executed to implement the example signature enhancer 101 of FIGS. 1 and 2 to enhance the example media signal 102 to satisfy the selected comparison threshold, as described above in conjunction with block 320 of FIG. 3. Although the example flowchart 320 is based on a signaturing algorithm corresponding to a comparison of a larger characteristic and a smaller characteristic of a media signal, the example flowchart 320 may be utilized for any type of signaturing algorithm comparing any number of characteristics. The larger characteristic corresponds to the characteristic with the larger value in the comparison and the smaller characteristic corresponds to the characteristic with the smaller value in the comparison. For example, in a frequency-based energy comparison signaturing algorithm, if $E_{F1}$ is 3.2 and $E_{F2}$ is 3.5, $E_{F1}$ is the smaller characteristic and $E_{F2}$ is the larger characteristic.

At block 400, the example characteristics enhancer 208 identifies a comparison that does not satisfy a comparison threshold (e.g., a first comparison flagged by the example characteristic analyzer 206). In the illustrated example of FIG. 4, the comparison is a comparison of a larger characteristic and a smaller characteristic of the media signal 102. Alternatively, any number of characteristics may be compared in any signaturing algorithm. Here, the larger characteristic is the stronger (e.g., higher) characteristic and the smaller characteristic is the weaker (e.g., lower) characteristic.

At block 402, the example characteristics enhancer 208 determines if boosting a larger characteristic of the comparison will create audible distortion and/or violate media signal requirements. If the example characteristics enhancer 208 determines that boosting the larger characteristic of the comparison will create audible distortion and/or violate media signal requirements, the process will continue to block 410. If the example characteristics enhancer 208 determines that boosting the larger characteristic of the comparison will not create audible distortion and/or will not violate media signal requirements, the example characteristics enhancer 208 will determine if boosting the larger characteristic will negatively affect a subsequent comparison (block 404). As described above in conjunction with FIG. 2, boosting a characteristic at a first time may negatively affect a subsequent comparison by decreasing the difference of the subsequent comparison such that the subsequent comparison no longer satisfies the comparison threshold.

If the example characteristics enhancer 208 determines that boosting the larger characteristic will negatively affect a subsequent comparison (block 404), the process continues to block 410. If the example characteristics enhancer 208 determines that boosting the larger characteristic will not negatively affect a subsequent comparison (block 404), the example characteristics enhancer 208 will boost the larger characteristic (block 406). The example characteristics enhancer 208 boosts the larger characteristic such that the boost will not create audible distortion, violate media signal requirements, and/or will negatively affect subsequent comparison. For example, if boosting the larger characteristic will create audible distortion at 3.2 J, the example characteristic enhancer 208 may boost the larger characteristic to 3.1 J.

At block 408, the example characteristic enhancer 208 determiners if, after boosting the larger characteristic, the comparison (e.g., the comparison of the larger characteristic and the smaller characteristic) satisfies the comparison threshold. Because the boosting of the larger characteristic is limited by audible distortion, media signal requirements, and/or subsequent comparisons, boosting the larger characteristic may or may not satisfy the comparison threshold. For example, in a frequency-based energy comparison signaturing algorithm where the energy of the larger characteristic is 2.9 and the energy of the smaller characteristic is 2.7, the larger characteristic may be boosted to 3.1. However, if the threshold comparison is 1, the comparison threshold will still not be satisfied after the larger characteristic is boosted (e.g., $|E_{F1}-E_{F2}|=3.1-2.7=0.4<1$). Accordingly, the smaller characteristic may also need to be decreased to satisfy the comparison threshold.

If the example characteristic enhancer 208 determines that the comparison satisfies the comparison threshold (block 408), the process continues to block 416. If the example characteristic enhancer 208 determines that the comparison does not satisfy the comparison threshold (block 408), the example characteristic enhancer 208 determines if attenuating (e.g., decreasing) the smaller characteristic of the comparison will create audible distortion and/or violate media signal requirements (block 410). If the example characteristics enhancer 208 determines that attenuating the smaller characteristic of the comparison will create audible distortion and/or violate media signal requirements (block 410), the process will continue to block 416. If the example characteristics enhancer 208 determines that attenuating the smaller characteristic of the comparison will not create audible distortion and/or will not violate media signal requirements (block 410), the example characteristics enhancer 208 will determine if attenuating the smaller characteristic will negatively affect a subsequent comparison (block 412).

If the example characteristics enhancer 208 determines that attenuating the smaller characteristic will negatively affect a subsequent comparison (block 412), the process continues to block 416. If the example characteristics enhancer 208 determines that attenuating the smaller characteristic will not negatively affect a subsequent comparison (block 412), the example characteristics enhancer 208 will attenuate (e.g., decrease) the smaller characteristic (block 414). The example characteristics enhancer 208 attenuates the smaller characteristic such that the attenuation will not create audible distortion, violate media signal requirements, and/or will negatively affect subsequent comparison.

At block 416, the example characteristics enhancer 208 determines if there is a subsequent comparison that does not satisfy a comparison threshold (e.g., a second comparison of two different characteristics or a second comparison with one of the first or smaller characteristic with an additional characteristic). If the example characteristics enhancer 208 determines that there is a subsequent comparison that does not satisfy the comparison threshold (block 416), the example characteristics enhancer 208 returns to block 402 to enhance one or more characteristics of the subsequent comparison.

Figure 5:
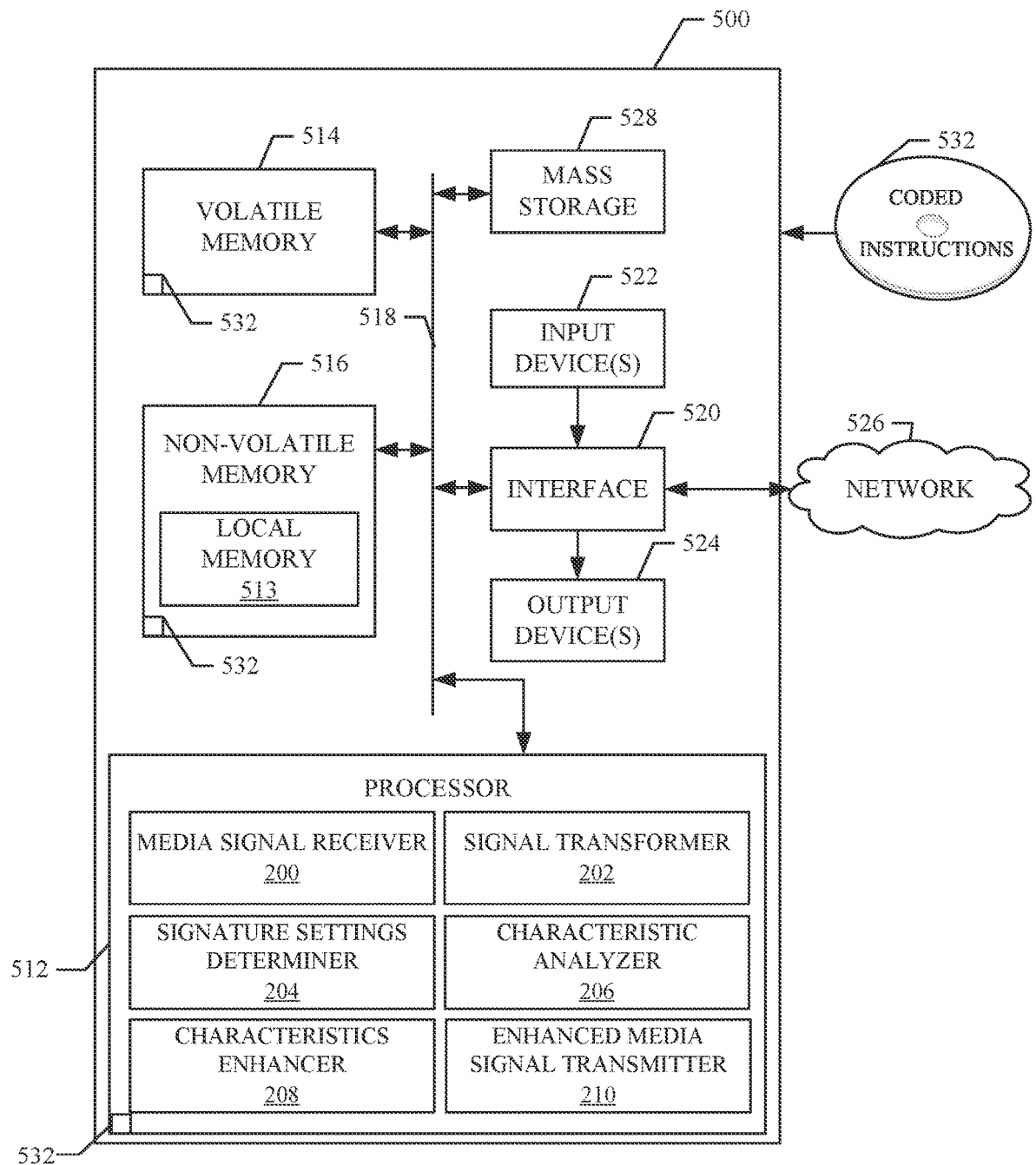
FIG. 5 is a block diagram of a processor platform structured to execute the example machine readable instructions of FIGS. 3 and 4 to control the example signature enhancer of FIGS. 1 and 2.

FIG. 5 is a block diagram of an example processor platform 500 capable of executing the instructions of FIG. 3 to implement the example signature enhancer 101 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes the instructions of FIG. 3 to implement the example media signal receive 200, the example signature settings determiner 202, the example signal transformer 204, the example characteristics analyzer 206, the example characteristics enhancer 208, and/or the example enhanced media signal transmitter 210 of FIG. 2 to implement the example signature enhancer 101. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a clock controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3 and 4 may be stored in the mass storage device 528, in the volatile memory 514, in the non-volatile memory 516, and/or on a removable tangible computer readable storage medium such as a CD or DVD.

From the foregoing, it would be appreciated that the above disclosed method, apparatus, and articles of manufacture increase the robustness of media signatures. Meters, or other media recognizing devices, intercept ambient audio, capture images, and/or intercept media signals to generate signatures based on characteristics of the ambient audio, captured image, and/or media signal to identify exposure to media. However, because media signals are subject to noise, the generated signatures may be inaccurate. Examples disclosed herein alleviate such signature-based problems related to noise by preprocessing a media signal to enhance the characteristics of the media signal.

Examples disclosed herein include determining where the signaturing algorithm is subject to inaccuracies. For example, when the signaturing algorithm is based on a difference between a first characteristic and a second characteristic, examples disclosed herein determines which differences are below a comparison threshold. Examples disclosed herein enhance at least one of the first or second characteristics to increase the difference, thereby decreasing the inaccuracies related to generating the signature. Examples disclosed herein may enhance the media signal by boosting the first characteristic and/or decreasing the second characteristic. Using examples disclosed herein, the robustness of media signatures is significantly increased, thereby increasing signature recovery accuracy.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A media pre-processing system comprising:
   at least one processor; and
   at least one computer readable storage medium having stored therein machine-readable instructions that, upon execution by the at least one processor, cause the media pre-processing system to at least:
   determine a difference based on first and second frequency components of an audio signal associated with media being pre-processed prior to distribution, the first and second frequency components indicative of energy levels of the audio signal associated with respective frequency values at a given time of the audio signal;
   determine, based on the difference, to perform at least one of: (A) boosting the first frequency component of the audio signal at the given time or (B) attenuating the second frequency component of the audio signal at the given time; and
   generate an enhanced audio signal by performing the determined one of (A) the boosting the first frequency component of the audio signal at the given time in the audio signal or (B) the attenuating the second frequency component of the audio signal at the given time in the audio signal.

2. The media pre-processing system of claim 1, wherein the instructions further cause, upon execution by the at least one processor, the media pre-processing system to:
   determine that an effect of the determined at least one of the boosting the first frequency component or the attenuating the second frequency component on a subsequent difference based on first and second frequency components of the enhanced audio signal will satisfy a threshold.

3. The media pre-processing system of claim 1, wherein the instructions further cause, upon execution by the at least one processor, the media pre-processing system to:
   receive the audio signal associated with the media being pre-processed prior to distribution; and
   output the enhanced audio signal.

4. The media pre-processing system of claim 1, wherein the instructions further cause, upon execution by the at least one processor, the media pre-processing system to at least one of provide the enhanced audio signal to an output of a first media output device, or transmit the enhanced audio signal to a second media output device.

5. The media pre-processing system of claim 1, wherein the instructions further cause, upon execution by the at least one processor, the media pre-processing system to:
   transform the audio signal to a frequency domain to thereby obtain frequency components indicative of energy levels of the audio signal associated with respective frequency values at the given time of the audio signal, the obtained frequency components including the first frequency component and the second frequency component.

6. The media pre-processing system of claim 1, wherein the instructions further cause, upon execution by the at least one processor, the media pre-processing system to:
   make a determination that the determined at least one of the boosting the first frequency component or attenuating the second frequency component will not cause at least one of an audible distortion, or a violation of a media requirement to occur within the enhanced audio signal; and
   wherein the generating the enhanced audio signal by performing the determined at least one of the boosting the first frequency component or attenuating the second frequency component is performed in response to making the determination.

7. The media pre-processing system of claim 1, wherein the instructions further cause, upon execution by the at least one processor, the media pre-processing system to determine the difference based on a signature generation algorithm.

8. The media pre-processing system of claim 1, wherein the boosting the first frequency component includes adding energy to the audio signal at the given time, the added energy having a frequency corresponding to the first frequency component.

9. At least one non-transitory computer readable medium having stored therein instructions which, when executed, cause one or more processors to at least:
   determine a difference based on first and second frequency components of an audio signal associated with media being pre-processed prior to distribution, the first and second frequency components indicative of energy levels of the audio signal associated with respective frequency values at a given time of the audio signal;
   determine, based on the difference, to perform at least one of: (A) boosting the first frequency component of the audio signal at the given time or (B) attenuating the second frequency component of the audio signal at the given time; and
   generate an enhanced audio signal by performing the determined one of (A) the boosting the first frequency component of the audio signal at the given time in the audio signal or (B) the attenuating the second frequency component of the audio signal at the given time in the audio signal.

10. The at least one computer readable medium of claim 9, wherein the instructions further cause the one or more processors to determine that an effect of the determined at least one of the boosting the first frequency component or the attenuating the second frequency component on a subsequent difference based on first and second frequency components of the enhanced audio signal will satisfy a threshold.

11. The at least one computer readable medium of claim 9, wherein the instructions further cause the one or more processors to at least one of provide the enhanced audio signal to an output of a media output device, or transmit the enhanced audio signal to a second media output device.

12. The at least one computer readable medium of claim 9, wherein the instructions further cause the one or more processors to:
   transform the audio signal to a frequency domain to thereby obtain frequency components indicative of energy levels of the audio signal associated with respective frequency values at the given time of the audio signal, the obtained frequency components including the first frequency component and the second frequency component.

13. The at least one computer readable medium of claim 9, wherein the instructions cause the one or more processors to:
   make a determination that the determined at least one of the boosting the first frequency component or attenuating the second frequency component will not cause at least one of an audible distortion, or a violation of a media requirement to occur within the enhanced audio signal; and
   wherein the generating the enhanced audio signal by performing the determined at least one of the boosting the first frequency component or attenuating the second frequency component is performed in response to making the determination.

14. The at least one computer readable medium of claim 9, wherein boosting the first frequency component includes adding energy to the audio signal at the given time, the added energy having a frequency corresponding to the first frequency component.

15. A method to enhance characteristics of media during pre-processing the media prior to distribution signal, the method comprising:
   determining a difference based on first and second frequency components of the audio signal associated with the media, the first and second frequency components indicative of energy levels of the audio signal associated with respective frequency values at a given time of the audio signal;
   determining, based on the difference, to perform, by executing an instruction with one or more processors, at least one of (A) boosting the first frequency component of the audio signal at the given time or (B) attenuating the second frequency component of the audio signal at the given time; and
   generating an enhanced audio signal by performing, by executing an instruction with the one or more processors, the determined one of (A) the boosting the first frequency component of the audio signal at the given time in the audio signal or (B) the attenuating the second frequency component of the audio signal at the given time in the audio signal.

16. The method of claim 15, wherein an effect of the determined at least one of the boosting the first frequency component or the attenuating the second frequency component on a subsequent difference based on first and second frequency components of the enhanced audio signal will satisfy a threshold.

17. The method of claim 15, further including:
   receiving the audio signal associated with the media being pre-processed prior to distribution; and
   outputting the enhanced audio signal.

18. The method of claim 15, further including at least one of providing the enhanced audio signal to an output of a media output device, or transmitting the enhanced audio signal to a second media output device.

19. The method of claim 15, further including transforming the audio signal to a frequency domain to thereby obtain frequency components indicative of energy levels of the audio signal associated with respective frequency values at the given time of the audio signal, the obtained frequency components including the first frequency component and the second frequency component.

20. The method of claim 15, further including:
   making a determination that the determined at least one of the boosting the first frequency component or attenuating the second frequency component will not cause at least one of an audible distortion, or a violation of a media requirement to occur within the enhanced audio signal; and
   wherein the generating the enhanced audio signal by performing the determined at least one of the boosting the first frequency component or attenuating the second frequency component is performed in response to making the determination.

* * * * *